Patented Apr. 21, 1936

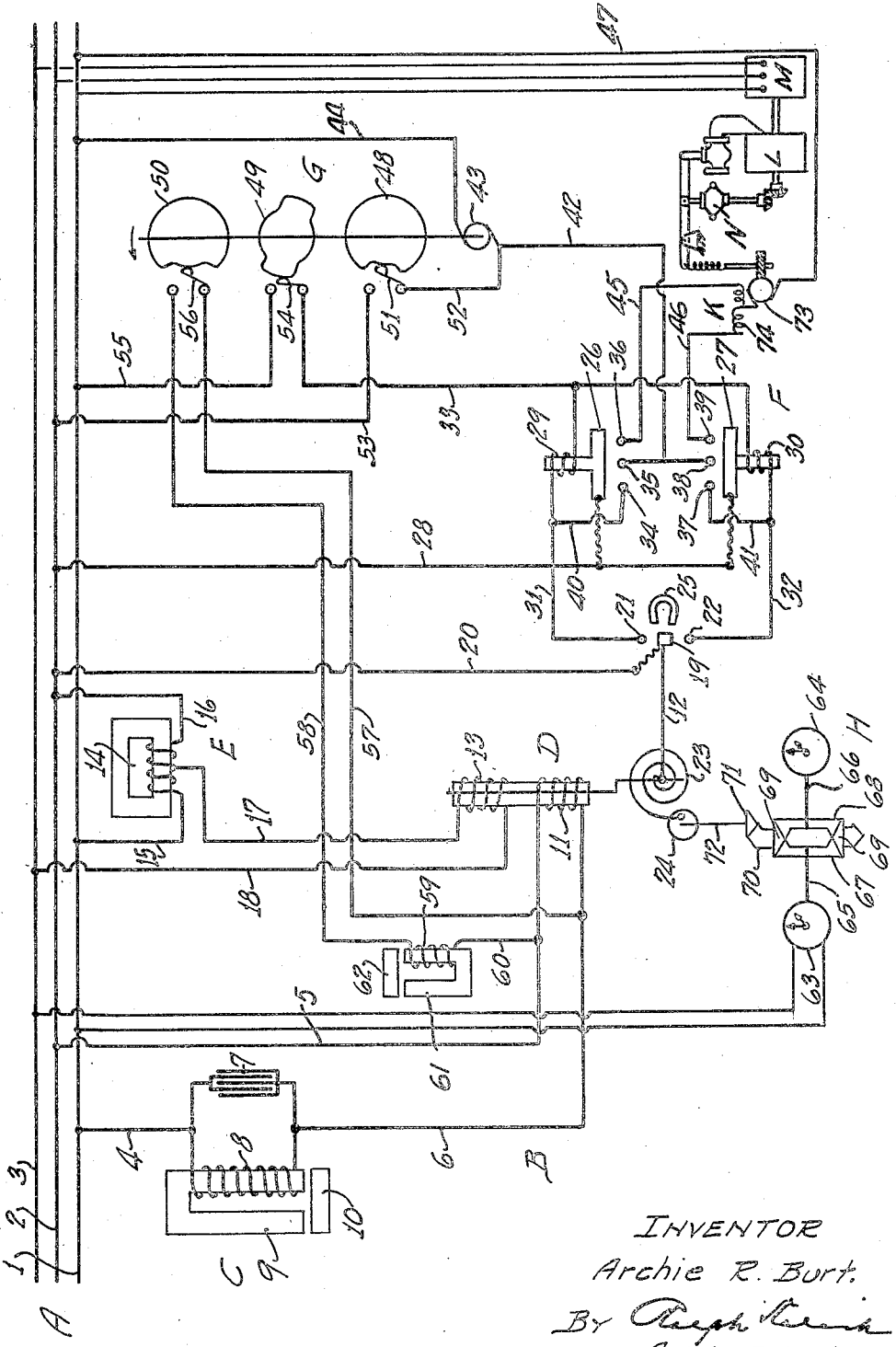

2,037,696

UNITED STATES PATENT OFFICE 2,037,696

ELECTRICAL FREQUENCY REGULATOR

Archie R. Burt, Hermann, Mo.

Application March 4, 1935, Serial No. 9,238

19 Claims. (Cl. 290—40)

This invention relates generally to electrical apparatus and has more particular reference to an electrical frequency regulator adapted for use with generating means including a prime mover governor and the like.

Modern electrical generating systems of the alternating current type, as central stations and the like, require a frequency control more selective and flexible than that afforded by the usual control features of prime mover governors as applied to steam turbines and the like for the purpose of maintaining an extremely accurate frequency of the electrical energy delivered to the distribution system.

Moreover, with the more general use of electrical synchronous clocks connected to the distribution system, it is important not only to maintain a standardized frequency, but also to prevent accumulative errors in the timing of such clocks, it being borne in mind that an average error of one one-hundredth of one percent cumulative for a period of ten days will result in an error of approximately eighty-six seconds of time.

My invention has hence for its prime object the provision of an electrical frequency regulator and its associated electrical circuits, which is accurate in operation, sensitive in adjustment, and sturdy in construction, and which is adapted and designed for interposition between the circuit whose frequency is to be controlled and the governor of the prime mover whose generator supplies such circuit, in such a way that any abnormality in the frequency acts on the control device, whereby the latter, after proper discrimination as to the magnitude and character of the fault, causes the governor of the prime mover to be adjusted for relieving or correcting the abnormality in the frequency in the controlled circuit.

My invention has for a further object the provision of an instrument for use in conjunction with the automatic frequency regulatory device and its associated circuit, which is designed to prevent small errors of timing, in the horological sense, from accumulating in the controlled circuit, which errors, if not otherwise compensated for, grow or cumulate into relatively large errors or discrepancies of time, seriously affecting the horological accuracy of electrical synchronous clocks and the like, which may be connected to the controlled circuit.

And with the above and other objects in view, my invention resides in the novel features of form, construction, arrangement, and combination of parts and electrical circuits associated therewith, as presently described and pointed out in the claims.

In the accompanying drawing, the figure is a circuit diagram of an electrical frequency regulator embodying the principles of my invention.

Briefly, my electrical frequency regulator is designed to supplement the usual prime-mover governor of a central station power plant where extremely accurate maintenance of frequency is desired but not attainable by the usual commercial type of prime-mover governor.

The regulator, which is employed in connection with a three-phase controlled circuit A, is primarily of an electrical nature and comprises a single phase relay circuit B in shunt with two of the three-phase mains of the circuit A, the relay circuit B containing a resonant filter circuit C of inductive and condensive reactances connected in parallel and tuned to reject the normal or standard frequency, the filter C being in series with the current coil of a single phase induction type of directional power relay D, which is also under control of a circuit E which is connected to the circuit A for maintaining a constant potential on the relay. The relay D actuates a contactor-assembly F, which is also under control of a self-actuating time-responsive means or controller G for at predetermined intervals sending corrective impulses of electrical current to the prime-mover governor control-motor K, the relay D being further under control of a horological device H for maintaining the horological accuracy of the controlled circuit A.

Referring now more in detail and by reference characters to the drawing, which diagrammatically illustrates the electrical circuit of a preferred embodiment of my invention, the reference characters 1, 2, 3, respectively, represent the mains of the three-phase circuit A, whose frequency is to be controlled, the circuit A being supplied by an alternating current generating apparatus represented as comprising the steam turbine L and generator M.

B designates a relay shunt circuit including the leads 4, 5, 6, the lead 4 being connected to the main 1, the lead 5 being connected to the main 2, and the lead 6 being an intermediate connection. In series with the leads 4, 6, is connected a filter circuit or condensive-inductive reactance group C, which comprises a condenser 7 preferably of the fixed plate type having a capacity of approximately 25 microfarads (mfd.), and an inductance 8 in parallel with the condenser 7, the inductance 8 having an equalized inductive reactance compared with the condensive reactance of the condenser 7 at the desired frequency of the controlled circuit A.

The inductance 8 is of the variable inductance type, one form of which may include the poles 9 of the inductance core and a pole-piece 10 shiftable toward and from the poles 9 for adjusting the air-gap therebetween, whereby the reactance of the inductance 8 may be varied for tuning the circuit C to resonance at the desired frequency, the leading condensive current of the condenser 7 being then, as will be understood, exactly neutralized by the opposite lagging inductive current of the inductance 8, so that if, for example, the neutralized frequency is 60 cycles per second and the controlled frequency is also 60 cycles per second, the circuit C will reject current at the resonant frequency and substantially no current will flow through the circuit B.

On the other hand, current flow in the circuit B is effected whenever the frequency of the controlled circuit A departs from the resonance frequency of the filter circuit C.

If the frequency in the line A rises above the resonance frequency, the leading current in the condenser 7 will be greater than the lagging current in the inductance 8, thus upsetting the resonance neutralization, and a current in positive time-quadrature with the applied voltage of the line A will flow through the circuit B, that is to say, the current will lead the applied voltage in the controlled circuit A.

Conversely, if the frequency in the line A falls below the resonance frequency, the lagging current in the inductance 8 will predominate and a current in negative time-quadrature, which lags the applied voltage in the line A, will then flow through the circuit B in a reverse direction to that of a leading current.

D designates an induction type of directional power relay having a so-called current coil 11 connected in series with the leads 5, 6, and which hence is included in the circuit B and is responsive to current flow therein, the coil 11 being wound for a current flow of merely one-half ampere, instead of the usual five amperes, for obtaining extreme sensitivity in the relay.

Disposed in the magnetic field of the coil 11, is a rotational member or switch-arm 12, which, in the present instance, and for illustrative purposes only, is arranged so that a leading current through the circuit B, responsive to "high" frequency conditions in the circuit A, will rotate the arm 12 in counter-clockwise direction, while a lagging current through the circuit B, responsive to "low" frequency conditions in the circuit A, will rotate the arm 12 in clockwise direction.

However, the magnetic field of the coil 11 is affected also by the applied voltage in the line A, and, in order that the motion of the arm 12 may be responsive only to current flow in the circuit B, the arm 12 is disposed also in the magnetic field of a so-called potential coil 13 forming part of a shunt circuit E, which is connected to the controlled circuit A, so that its voltage is in time-quadrature with the voltage of the circuit B.

This is accomplished preferably by means of an auto-transformer 14, whose terminals are connected by leads 15, 16, with the mains 1, 2, respectively, and whose mid-tap is connected by a lead 17 with one end of the coil 13, the other end of the coil 13 being connected by a lead 18, with the main 3 of the circuit A.

As a result, the applied voltage exciting the coil 13 is in time-quadrature with the applied voltage exciting the coil 11, so that a constant potential is maintained on the relay D and the relay D is thus made responsive only to condensive or reactive current flow in the circuit B.

The arm 12 carries a contactor 19, which has flexible connection with a lead 20 connected, in turn, to the main 2 of the circuit A. The contactor 19 has co-operation with a pair of spaced stationary upper and lower contacts 21, 22, respectively, forming a single pole double throw switch operable in such manner that the contactor 19 will, on counter-clockwise rotation thereof responsively to leading current flow in the circuit B, engage the contact 21, and on clockwise actuation of the arm 12 responsive to lagging current flow in the circuit B will engage the contact 22.

For normally maintaining the contactor 19 in neutral position, that is to say, in more or less spaced relation with respect to the contacts 21, 22, a tensional member in the form preferably of a helical hair-spring 23 is provided, which, in the present instance, has its inner end connected to the pivot-shaft of the arm 12 and has its outer end eccentrically connected to a rotatory member of suitable design, diagrammatically shown at 24.

The member 24, by suitable manual means, not shown, and also by further means presently more fully described, may be rotated in one direction or another for varying the tension of the spring 23 for biasing the contactor 19 toward either of the contacts 21, 22, or exactly midway between them, as may best serve the purpose of adjusting the responsiveness of the relay D to intensity of current flow in the circuit B passed by the filter C on occurrence of abnormalities in the frequency of the controlled circuit A.

A permanent drag-magnet 25 is also provided for effecting a stabilizing influence on the moving element or arm 12 and its carried contactor 19.

F designates a magnetically operated switch assembly comprising a pair of independently movable elements or contactors 26, 27, flexibly connected to a lead 28, which, in turn, is connected to the main 2 of the circuit A.

The respective contactors 26, 27, are controlled in the usual manner by means of solenoids 29, 30, respectively, the solenoid 29 at one end being connected by a lead 31 with the upper contact 21 of the relay D, and similarly, the solenoid 30 at one end is connected by a lead 32 with the lower contact 22 of the relay D. At their respective other ends, the solenoids 29, 30, are connected by a lead 33 with a time responsive controller G, presently to be more fully described, but of which it may here be said that normally the lead 33 is connected through the controller G with the main 1 of the circuit A.

The contactor 26, when actuated by its solenoid 29, simultaneously engages three stationary contacts 34, 35, 36. Similarly, the contactor 27 is adapted for simultaneously engaging three stationary contacts 37, 38, 39.

The contact 34 is connected by a lead 40 with the lead 31 of the solenoid 29, and the contact 37 is connected by a lead 41 with the lead 32 of the solenoid 30.

The contacts 35 and 38 are connected together and thence, by a lead 42, are connected to one terminal of a motor 43 which actuates the controller G, the other terminal of the motor 43 being connected by a lead 44 with the main 1 of the circuit A.

The contact 36 is connected by a lead 45 with the "reduce speed" side of the prime-mover governor control-motor K, and the contact 39 is connected by a lead 46 with the "increase speed" side of the governor control-motor K, current impulses sent over these lines being returned to the main 1 of the circuit A through a lead 47 connected thereto.

The governor control-motor K is of the conventional type, one form of which may include an armature 73 and a split-field 74, the field 74 being connected at one end to the lead 45 and at its other end to the lead 46. The mid-tap of the field 74 is connected to one side of the motor or armature 73, whose other side is connected to the lead 47. Hence, when current impulses are sent through the lead 45, the armature 73 turns in one direction, and when current impulses are sent through the lead 46, the armature 73 turns in the opposite direction, for correspondingly adjusting the governor, which, in turn, changes the speed of the prime-mover for regulating the frequency of the controlled circuit A, the armature 73 being, as shown, associated with the governor N of the turbine L in any conventional manner.

Upon occurrence of a "high" frequency condition in the circuit A, whereby the relay D is caused to close the circuit through its contacts 19, 21, current will flow from the main 2 through lead 20, contacts 19, 21, lead 31, solenoid 29, lead 33 and controller G to the main 1.

As a result, the solenoid 29 is energized for closing the contactor 26 upon the contacts 34, 35, 36. Current will then flow from the main 2 through lead 28 to the contactor 26, and from thence through the contact 34, leads 40 and 31, solenoid 29, lead 33, and controller G to the main 1, for maintaining the energization of the solenoid 29, regardless of the action of the relay D, until such time as this circuit is interrupted by the controller G, in a manner later more fully appearing.

At the same time, current will also flow through contacts 26, 35, lead 42, motor 43, and lead 44 to the main 1, for energizing the motor 43 for initiating actuation of the controller G.

Similarly, a corrective current impulse will flow through contacts 26, 36, and lead 45 to the "reduce speed" side of the prime-mover governor control-motor K, this current returning through lead 47 to the main 1.

Conversely, upon occurrence of a "low" frequency condition in the circuit A, the relay D will close the contacts 19, 22, and current will then flow from main 2 through lead 20, contacts 19, 22, lead 32, solenoid 30, lead 33, and controller G to the main 1.

The solenoid 30 is now energized for closing the contactor 27 upon the contacts 37, 38, 39. Current will then flow from the main 2 through the lead 28 to the contactor 27, and from thence through contact 37, leads 41 and 32, solenoid 30, lead 33 and controller G to the main 1, for, as before, maintaining the energization of the solenoid 30 until this circuit is broken by the controller G.

At the same time, the motor 43 is energized by flow of current from contactor 27 to contact 38 and thence through lead 42, as before stated, while, similarly, a corrective current impulse will flow through contact 39 to lead 46 and thence to the "increase speed" side of the governor control-motor K, this current likewise returning through lead 47 to the main 1.

The controller G comprises a series of three cams 48, 49, 50, mounted on a common shaft actuable by the motor 43.

The cam 48 is a motor cut-off cam, which co-operates with a normally open switch 51 whose one terminal is connected by a lead 52 with the motor 43, and whose other terminal is connected by a lead 53 with the main 2 of the circuit A, the cam 48 acting to close the switch 51 on initial actuation of the controller G, responsive to actuation of the contactors 26 or 27, as the case may be, for subsequently maintaining actuation of the controller G until the completion of its cycle of operation, when the cam 48 will act to open the switch 51 for bringing the controller G to rest at its initial or starting position, the motor 43 having a constant speed during the complete cycle of the controller G, so that the latter has a definite time-interval in which to perform its controlling cycle.

The cam 49 is a multiple-lobe cam (two lobes being shown in the present instance), which is co-operable with a switch 54 whose one terminal is connected to the lead 33 from the solenoids 29, 30, and whose other terminal is connected by a lead 55 with the main 1 of the circuit A, the cam 49 normally holding the switch 54 in closed position in readiness for energization of the solenoids 29 or 30, as the case may be, whenever the relay D is actuated responsively to frequency abnormalities in circuit A, as hereinbefore set forth.

However, after a suitable predetermined interval of operation of the controller G, the cam 49 acts to open the switch 54 for interrupting the circuit through the leads 33, 55, and thus de-energizing the solenoid 29 or 30, as the case may be, whereby the particular contactor 26 or 27 is disengaged from its associated contacts for both opening the motor circuit through the lead 42, and interrupting or suspending the corresponding corrective current impulse being sent to the prime-mover governor control-motor K through the lead 45 or 46.

The cam 48, however, has by this time closed the switch 51 and energization of the motor 43 is now effected through the lead 52 for continuing the actuation of the controller G.

After the contactor 26 or 27 has been "dropped out", the cam 50 acts to close a normally open switch 56, whose one terminal is connected through a lead 57 with the lead 6 of the circuit B, and whose other terminal is connected by a lead 58 with one end of an impedance coil 59, the other end of the coil 59 being connected by a lead 60 with the lead 5 of the circuit B.

The coil 59 is preferably of the adjustable inductance type, such as may be provided by poles 61 co-operable with an adjustable pole-piece 62 for varying the inductance of the coil 59, and is designed to have a resistance and reactance proportional to the resistance and reactance of the current coil 11 of the relay D.

It is anticipated that a certain time interval will be required for the governor of the prime-mover to respond to the first impulse of speed correction, and the function of the coil 59 is to decrease the sensitivity of the relay D to current flow passed by the filter C for preventing a second corrective impulse, which would normally occur responsive to operation of the controller G, as shortly appearing, from taking place when the first is sufficient.

This is accomplished when the switch 56 is closed, which shunts a portion of the current flowing in the leads 5, 6, through the lead 57, switch 56, lead 58, coil 59, and lead 60, and thus around the relay current coil 11, thereby weakening the field of the coil 11 and permitting the spring 23 to bring the arm 12 more or less to neutral position, provided, of course, that increased departure of the frequency from normal has not resulted in increased current flow in the circuit B.

After a suitable time interval has elapsed, the second lobe of the cam 49 acts for again closing the switch 54. If at this time the frequency in the circuit A has still further departed from the standard frequency sufficiently to close the relay contacts in spite of the weakening influence of the shunt coil 59, the relay D will act, substantially in the manner hereinbefore described, for sending a second frequency corrective current impulse to the prime-mover governor control-motor K.

As before, after a definite time-interval, the switch 54 is again opened for suspending the current impulse to the governor control-motor K. The cycle of the controller is completed when the first lobe of the cam 49 has returned to its initial position with the switch 54 once more in closed position.

Prior to completion of the controller-cycle, however, the cam 50 acts for opening the switch 56, interrupting the shunt circuit through the coil 59, and thus restoring the normal sensitivity of the relay D, while at the end of the cycle, the cam 48 opens the switch 51 for de-energizing the motor 43 and bringing the controller G to rest.

In the event that the frequency is still abnormal at the completion of the controller cycle, it will be seen that the relay D is now free to respond to such frequency abnormality, and the foregoing cycle will be repeated until the abnormality is corrected.

The horological control or time make-up device H includes an electric synchronous clock 63, and an escapement type of clock or chronometer 64. The electric clock 63 is actuable in the usual well known manner by current supplied from the circuit A and is provided with a shaft-extension 65, which is so geared to the movement of the clock 63 as to have a rate of rotation of one R. P. M. when the frequency of the circuit A is correct.

The escapement clock 64 is likewise provided with a shaft-extension 66 axially opposing the shaft 65 and so geared to the movement of the clock 64 as to have a rate of rotation of one R. P. M., in opposite direction, however, to the direction of rotation of the shaft 65.

On the shaft 65 is mounted a differential gear 67, and on the shaft 66 is mounted a like gear 68, between which is co-operably disposed a series of differential pinions 69 carried by a ring gear 70 in the manner common to differential-gear construction, the ring gear 70 having co-operation with a pinion 71 mounted on a shaft 72, which, in turn, has suitable rotative connection with the frequency-adjusting element 24 of the relay D.

Inasmuch as the shafts 65, 66, rotate in opposite directions, it will be seen that, while there will be no rotation of the ring-gear 70 when the respective rates of rotation of the shafts 65, 66, are exactly the same, there will be a rotation of the ring-gear 70 whenever a time-difference exists between the clocks 63, 64, and, such rotation of the gear 70 being transmitted through the pinion 71 and shaft 72 to the adjusting element 24, the spring 23 of the relay D will be correspondingly biased for raising or lowering the controlled frequency of the circuit A until the clocks 63, 64, are again in agreement and the horological accuracy of the circuit A is restored.

The manner of operation of my frequency control regulator having been fully set forth as the description has proceeded, it suffices here merely to say that the filter circuit C is effective for preventing flow of current in the relay control circuit B when the frequency in the controlled circuit A is at its desired value.

Upon occurrence of abnormal frequency in the circuit A, however, the circuit C will pass current of appropriate direction for actuating the relay D, which, in turn, causes the actuation of one or the other of the contactors in the switch assembly F for sending an appropriate corrective current-impulse to the prime-mover governor control-motor K.

Thereafter the controller G breaks the circuit of the switch assembly F for suspending flow of current to the governor control-motor K and meanwhile shunts the relay D with a suitable impedance for decreasing its responsiveness to intensity of current flow in the relay circuit B, so that a still greater abnormality from normal frequency in the circuit A is necessary to actuate the relay D.

After a suitable interval of time, the controller G closes the circuit of the switch-assembly F for allowing the relay D to retest, as it may be said, the frequency in the circuit A, and, if the frequency has still further departed from the standard, the circuit C will admit more current, and the relay D will respond to resulting increased current flow in the circuit B for again sending a corrective current impulse to the governor control-motor K.

However, if the frequency abnormality has not increased, or if the abnormality has been corrected, the relay D will be inactive and no current impulse will be sent to the governor control-motor K.

After a further time-interval, the impedance-shunt of the relay D is cut-out by the controller G, the sensitivity of the relay D is increased to its normal responsiveness, and all parts are restored to initial position. If, at this time, the frequency abnormality has not been corrected, the foregoing cycle of operations is repeated, as many times as is necessary, until the frequency of the circuit A is restored to its standard or normal value.

The horological device H acts for biasing the relay D so as to increase its responsiveness to current flow in the circuit B in one direction or the other, so that the action of the relay D is to temporarily increase or decrease the frequency for a sufficient duration of time to maintain the horological accuracy of the frequency in the circuit A.

It will be understood that changes and modifications in the form, construction, arrangement, and combination of the several parts of my frequency controller may be made and substituted for those herein shown and described without departing from the nature and principle of my invention.

Having thus described my invention, what I claim and desire to secure by Letters Patent is,—

1. In mechanism for regulating frequency in a controlled circuit having generating means which includes a prime-mover and its governor, in combination, a governor-circuit including a motor operable for frequency regulation responsively to electrical current impulses, and means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, and a relay responsive to current flow in the relay circuit.

2. In mechanism for regulating frequency in a controlled circuit having generating means which includes a prime-mover and its governor, in combination, a governor-circuit including a motor operable for frequency regulation responsively to electrical current impulses, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, and a relay responsive to current flow in the relay circuit, and means for reducing the responsiveness of the relay to current flow in the relay circuit after initial impulse-sending actuation of the relay.

3. In mechanism for regulating frequency in a controlled circuit having generating means which includes a prime-mover and its governor, in combination, a governor-circuit including a motor operable for frequency regulation responsively to electrical current impulses, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, and a relay responsive to current flow in the relay circuit, and means including a shunt impedance for connection across the relay circuit for reducing the responsiveness of the relay to current flow in the relay circuit.

4. In mechanism for regulating frequency in a controlled circuit having generating means which includes a prime-mover and its governor, in combination, a governor-circuit including a motor operable for frequency regulation responsively to electrical current impulses, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, and a relay responsive to current flow in the relay circuit, an impedance circuit, and means for shunting the impedance circuit across the relay circuit for reducing the responsiveness of the relay to current flow in the relay circuit.

5. In mechanism for regulating frequency in a controlled circuit having generating means which includes a prime-mover and its governor, in combination, a governor-circuit including a motor operable for frequency regulation responsively to electrical current impulses, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, a directional relay actuable responsively to flow of current in the relay circuit, and switching circuits for respective energization responsive to directional motion of the relay.

6. In mechanism for regulating frequency in a controlled circuit having generating means which includes a prime-mover and its governor, in combination, a governor-circuit including a motor operable for frequency regulation responsively to electrical current impulses, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, a directional relay actuable responsively to flow of current in the relay circuit, switching circuits for respective energization responsive to directional motion of the relay, and time-responsive means for controlling the duration of energization of said switching circuits.

7. In mechanism for regulating frequency in a controlled circuit having generating means which includes a prime-mover and its governor, in combination, a governor-circuit including a motor operable for frequency regulation responsively to electrical current impulses, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, a directional relay actuable responsively to flow of current in the relay circuit, switching circuits for respective energization responsive to directional motion of the relay, and time-responsive means including a power-actuated controller for controlling the duration of energization of said switching circuits.

8. In mechanism for regulating frequency in a controlled circuit having generating means which includes a prime-mover and its governor, in combination, a governor-circuit including a motor operable for frequency regulation responsively to electrical current impulses, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, a directional relay actuable responsively to flow of current in the relay circuit, and switching circuits for respective energization responsive to directional motion of the relay, time-responsive means including a power-actuated controller for controlling the duration of energization of said switching circuits, and means for initiating actuation of the controller responsive to directional motion of the relay.

9. In mechanism for regulating frequency in a controlled circuit having generating means which includes a prime-mover and its governor, in combination, a governor-circuit including a motor operable for frequency regulation responsively to electrical current impulses, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, a directional relay actuable responsively to flow of current in the relay circuit, and switching circuits for respective energization responsive to directional motion of the relay, time-responsive means including a power-actuated controller for controlling the duration of energization of said switching circuits, means for initiating actuation of the controller responsive to directional motion of the relay, and means responsive to actuation of the controller for reducing the responsiveness of the relay to current flow in the relay-circuit.

10. In mechanism for regulating frequency in a controlled circuit having generating means which includes a prime-mover and its governor, in combination, a governor-circuit including a motor operable for frequency regulation responsively to electrical current impulses, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, a directional relay actuable responsively to flow of current in the relay circuit, and switching circuits for respective energization responsive to directional motion of the relay, a controller having a definite time-cycle of operation for controlling the duration of energization of said switching circuits, and means for initiating actuation of the controller responsive to directional motion of the relay.

11. In mechanism for regulating frequency in a controlled circuit having generating means which includes a prime-mover and its governor, in combination, a governor-circuit including a motor operable for frequency regulation responsively to electrical current impulse, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, a directional relay actuable responsively to flow of current in the relay circuit, and switching circuits for respective energization responsive to directional motion of the relay, a controller having a definite time-cycle of operation for controlling the duration of energization of said switching circuits, means for initiating actuation of the controller responsive to directional motion of the relay, and means responsive to controller-actuation for shunting an impedance across the relay for the duration of the time-cycle of the controller.

12. In mechanism for regulating frequency in a controlled circuit having generating means which includes a prime-mover and its governor, in combination, a governor-circuit including a motor operable for frequency regulation responsively to electrical current impulses, means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, a directional relay actuable responsively to flow of current in the relay circuit, and switching circuits for respective energization responsive to directional motion of the relay, time-responsive means including a power-actuated controller for controlling the duration of energization of said switching circuits, and time-responsive means actuable responsive to initial directional motion of the relay for repetitively cutting-in and cutting-out said switching circuits for permitting a multiple number of said current impulses to be sent at definite time-intervals to the motor.

13. In mechanism for regulating frequency in a controlled circuit having generating means which includes a prime-mover and its governor, in combination, a governor-circuit including a motor operable for frequency regulation responsively to electrical current impulses, and means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, and a relay responsive to current flow in the relay circuit, horological means including an escapement clock and an electrical synchronous clock differentially connected, and means responsive to differential motion of said clocks for adjusting the responsiveness of the relay to intensity of current flow in the relay circuit.

14. In mechanism for regulating frequency in a controlled circuit having generating means which includes a prime-mover and its governor, in combination, a governor-circuit including a motor operable for frequency regulation responsively to electrical current impulses, and means automatically responsive to variations in the frequency of the controlled circuit for sending frequency corrective impulses to the motor, said last means comprising a relay circuit in shunt with the controlled circuit, a filter in the relay circuit tuned to reject current at normal frequency and to pass current at abnormal frequency, and a relay responsive to current flow in the relay circuit, and horological means for adjusting the responsiveness of the relay to intensity of current flow in the relay circuit.

15. In mechanism for regulating frequency in a controlled circuit having generating means which includes a prime-mover and its governor, in combination, a governor-circuit including a motor operable for frequency regulation responsively to electrical current impulses, and means automatically responsive to variations in the frequency of the controlled circuit for sending frequency corrective impulses to the motor, said last means including a relay circuit in shunt with the controlled circuit, a current responsive coil in said circuit, a relay responsive to field strength of the coil, and an impedance in shunt with the coil for weakening the field strength thereof.

16. In mechanism for regulating frequency in a controlled circuit having generating means which includes a prime-mover and its governor, in combination, a governor-circuit including a motor operable for frequency regulation responsively to electrical current impulses, and means automatically responsive to variations in the frequency of the controlled circuit for sending frequency corrective impulses to the motor, said last means including a relay circuit in shunt with the controlled circuit, a frequency filter in said relay circuit for rejecting normal frequency current from the circuit, a current responsive coil in said circuit, a relay responsive to field strength of the coil, and an impedance in shunt with the coil for weakening the field strength thereof.

17. In mechanism for regulating frequency in a controlled circuit having generating means which includes a prime-mover and its governor, in combination, a governor-circuit including a motor operable for frequency regulation responsively to electrical current impulses, and means automatically responsive to variations in the frequency of the controlled circuit for sending frequency corrective impulses to the motor, said last means including a relay circuit in shunt with the controlled circuit, a relay including an armature responsive to current flow in the relay circuit, tensional means for biasing the armature, and horological means for varying the bias of the tensional means.

18. In mechanism for regulating frequency in a controlled circuit having generating means which includes a prime-mover and its governor, in combination, a governor-circuit including a motor operable for frequency regulation responsively to electrical current impulses, and means automatically responsive to variations in the frequency of the controlled circuit for sending frequency corrective impulses to the motor, said last means including a relay circuit in shunt with the controlled circuit, a relay in the relay circuit responsive to current flow therein, and electrical means for reducing the response of the relay to current variations in the relay circuit.

19. In mechanism for regulating frequency in a controlled circuit having generating means which includes a prime-mover and its governor, in combination, a governor-circuit including a motor operable for frequency regulation responsively to electrical current impulses, and means automatically responsive to variations in the frequency of the controlled circuit for sending frequency corrective impulses to the motor, said last means including a relay circuit in shunt with the controlled circuit, a relay in the relay circuit responsive to current flow therein, and means including a shunt impedance for connection across the circuit for reducing the response of the relay to current variations in the relay circuit.

ARCHIE R. BURT.